July 18, 1950     O. R. CARPENTER ET AL     2,515,191

METHOD OF JOINING METALS

Filed Aug. 29, 1946

Otis R. Carpenter &
Nicholas C. Jessen
INVENTORS

BY
*W. Holbrook* ATTORNEY

Patented July 18, 1950

2,515,191

UNITED STATES PATENT OFFICE 2,515,191

METHOD OF JOINING METALS

Otis R. Carpenter, Barberton, and Nicholas C. Jessen, Akron, Ohio, assignors to The Babcock & Wilcox Company, Rockleigh, N. J., a corporation of New Jersey Application August 29, 1946, Serial No. 693,798

2 Claims. (Cl. 22—204)

This invention relates to a method of joining metals, and more particularly to such a method which inherently prevents oxidation at the juncture zone of the metals.

The method of this invention is particularly adapted to the joining of metals which, due to the formation of refractory oxides on heating, cannot ordinarily be successfully welded by solid phase welding processes such as forge welding or roll welding. For example, the invention is particularly adapted to the joining of steels of the stainless chromium or chromium-nickel types to carbon steel.

A major object of the invention is the method for joining of non-ferrous metals, high carbon metals, or wear resistant metals to carbon steels.

A further object of the invention is to present a method of joining of plain carbon steel to stainless chromium-nickel steels to form a composite plate one face of which is corrosion resistant and the other a common carbon steel face.

The invention will be described with reference to the accompanying drawings which illustrate the steps of the method, and other objects of the invention will appear as the description proceeds.

Figure 1:
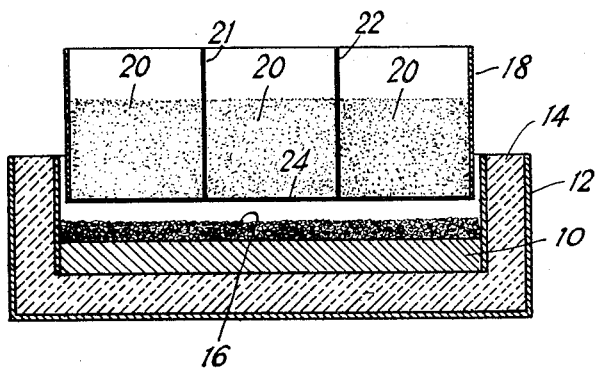
Fig. 1 is a vertical section through a refractory lined box in which are disposed the materials involved in the method.
Figure 2:
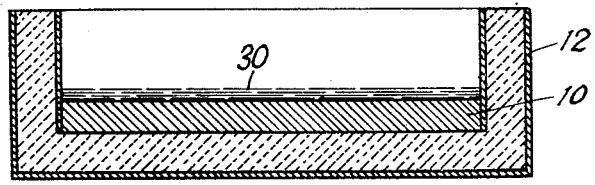
Fig. 2 is a vertical section of the refractory lined box containing the composite product of the described method.

Various methods of producing clad plate or other composite metals have been suggested. In the practice of some of these methods, it has been impossible to maintain a consistent thickness of the clad layer or corrosion resistant layer on the steel backing plate. Also, in the practice of some of these suggested methods it is impossible to reliably maintain the chemical analysis of the clad or stainless stratum within specific limits. Further many of the suggested processes do not result in consistent or a continuous bond over the interface of the adjoining metals. Also, some of the suggested methods result in brittle or hardened zones at the fusion line. This occurs in many instances as a result of the carbon migration from a plain carbon steel to the alloy (or clad) and results in loss of ductility and loss of corrosion resistance in the ultimate product.

The present invention overcomes such difficulties as those mentioned above and results in a completely bonded and stable composite metal product, with its components uniformly fused in the process of manufacture.

By way of illustration, and not of limitation, the invention is disclosed herein as applied to the production of clad plate, the illustrative method involving the preheating of a plate of stainless steel while the plate is protected from oxidation. The preferred method of preventing oxidation is to heat the plate under a protective flux covering, the flux preferably possessing sufficient thermal stability to prevent disintegration or spontaneous evaporation at the temperature attained in the preheating. In the practice of the invention, there has been successful use of fluxes containing silicates, fluorides, and tetraborates of the alkali metals such as sodium or potassium. Preferably, the flux should have a melting point which is close to the preheat temperature of the process.

In the illustrative process, a stainless steel plate 10 is disposed within a box 12 having a refractory lining 14, the upper surface of the plate 10 having previously been thoroughly cleaned so that no foreign material remains. The upper surface of the stainless steel plate 10 is then covered with a substantial stratum of flux 16.

The next step in the process is to preheat the above assembly to attain a predetermined temperature of the stainless steel plate 10.

After this temperature is attained, a box 18 containing Thermit powder 20 is lowered into the refractory box 12 to a point near the surface of the flux 16, the preheat temperature of the stainless steel layer 10 being, in the meantime, maintained. The Thermit material within the box 18 is subdivided by partitions such as those indicated at 21 and 22 as an aid in obtaining an even reaction rate over the entire area when the Thermit is ignited, and the Thermit is maintained within the box by a light gauge metal bottom 24.

With the Thermit within the box 18 in operative position such as that indicated in Fig. 1, the Thermit charge is ignited, and upon ignition the following chemical reaction occurs (when the Thermit is iron Thermit):

$$8Al + 3Fe_3O_4 = 9Fe + 4Al_2O_3$$

The heat of the reaction melts the box 18 and the melted steel of the box joins the molten iron produced by the Thermit reaction, and, as the reaction progresses, the newly formed iron superheated to a temperature in excess of 5,000 degrees F. separates from the Thermit, or its reaction product, and settles downwardly through the flux layer 16 and deposits upon and fuses to the preheated stainless steel plate 10. The preheat temperature of the plate 10 is maintained during the formation of the iron, during the settling of the iron stratum through the flux, and at least up to the time of heat transfer from the iron to the plate 10.

Some of the aluminum oxide resulting from the Thermit process settles through the silicate flux used during heating and forms a layer on top of the deposited iron 32, three times as thick as the iron layer. On top of this layer and fused to it is a green layer about 3/8" thick of fused silica obtained from the superheating of the flux. This heavy slag deposit results in a smooth cast surface to the deposited metal thereby facilitating slag removal.

For a given amount of superheated metal obtained from the Thermit charge, there is available a fixed amount of heat. Some of this heat is lost to the atmosphere or other surroundings and the balance of the heat is sufficient to produce fusion temperatures at the surface of the stainless sheet 10 and form a fused bond between the sheet and the deposited Thermit metal. The heat which produces the fusion of the plate 10 may be regulated as to the depth of fusion, the amount of alloying and thickness of the deposited layer by a number of controllable factors, examples of which are given below.

Changing the amount of the Thermit charge alters the thickness of the deposited metal and also raises the temperature at which this metal reaches the surface of the plate 10. A charge sufficient to deposit a layer of metal (on plate 10) approximately 3/8" thick is preferred, in the practice of the invention.

Major controlling factors in the illustrative method involve the flux depth and the physical characteristics of the flux. An increase in the flux depth reduces the depth of fusion of the molten metal in the plate, and a decrease in the flux depth has the opposite effect. This results from the quenching action of the flux on the molten metal as it settles to the stainless steel plate 10. The action of the flux is controlled by various factors such as the chemical nature of the flux, its fluid viscosity, or other physical properties.

The thickness of the plate also has an influence upon the depth of fusion. Thinner plates require molten metal temperatures and plate preheat temperatures lower than thicker plates.

To prevent excessive melting of the base metal (or the plate 10) and excessive alloying of the deposited metal, the preheat should be such that the depth of fusion of the plate is not excessive. With proper preheat control, a substantially pure iron deposit 30 may be attained.

A typical set of conditions established to deposit a 3/8" thick layer of iron on a 1" thick plate of stainless steel includes a preheat temperature of 1650 degrees F. and a depth of molten flux of 3/8".

Such a stratum of iron as that above indicated is termed "thermitic iron."

Figure 3:
Fig. 3 is a sectional view of the composite plate consisting, for example, of a layer of iron secured to a stainless steel base.

When a deposit such as that described above has been attained and the superposed slag removed, as by sand-blasting or pickling, the resulting product is a composite plate such as that indicated in Fig. 3— a layer 32 of iron and a base 10 of stainless steel. The surface of the iron layer 32 is then cleaned as by sand-blasting, pickling or any other suitable procedure, and it is then placed in contact with the cleaned surface of a plain carbon steel slab 36, the stainless stratum 10 being the external stratum of this assembly. The composite product including iron and stainless steel strata 32 and 10, respectively, is then secured to the slab 36 by welds such as those indicated at 38 and 40 and the composite slab is hot rolled to bond the iron stratum 32 to the slab 36 while the product is reduced to the desired ultimate thickness. Preferably, welds such as 38 and 40 extend entirely around the edges of the Fig. 3 product, sealing it to the slab 36.

Preferably, before rolling the composite slab consisting of the strata 10, 32, and 36, it is placed in a furnace and heated to a temperature at which it can be forge or roll welded. When welded by rolling, clad plate of the desired thickness is produced.

Figure 4:
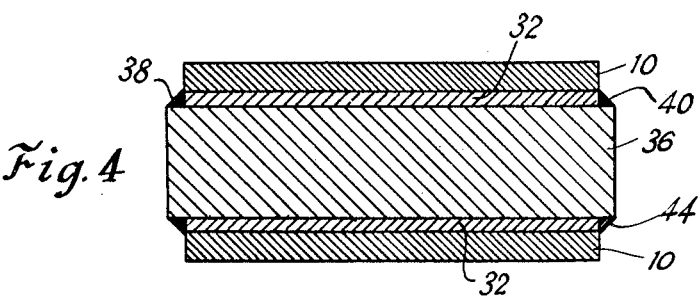
Fig. 4 is a vertical section through a composite slab with the composite product of Fig. 3 secured to each side of a plain carbon steel base and arranged for hot rolling to produce clad plate with the cladding on each side thereof.
Figure 5:
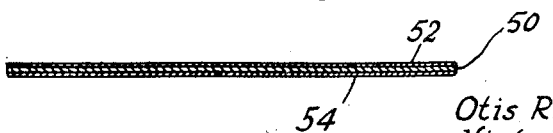
Fig. 5 is a section of the double clad plate resulting from the hot roll welding reducing of the Fig. 4 assembly.

If an ultimate product is desired with the plain carbon steel base clad with stainless steel on both surfaces, the plain carbon steel slab has a composite plate similar to the Fig. 3 plate secured in the same manner to each of its opposite sides as indicated in Fig. 4, with a circumscribing weld joining each composite plate to the slab 36. Thereafter, the entire assembly is heated to a temperature for hot reduction by rolling or pressing, and a double clad product such as that indicated in Fig. 5 results. This includes the intermediate stratum 50 of plain carbon steel and the opposite and thinner strata 52—54 of stainless steel.

A distinctive characteristic of the illustrative process is the purification of the deposited molten metal as it settles through the flux to the base plate 10, and it is to be appreciated that this is true, regardless of the particular metal deposited. If it is desired to deposit stainless steel on a plate of plain carbon steel stainless Thermit is employed.

What is claimed is:

1. In a method of forming clad plate, depositing a thick flux stratum over the upper surface of a stainless steel plate of substantial thickness, preheating the plate to a temperature less than the fusion temperature of the plate, and applying and reacting an iron alumino-thermic mixture above the upper surface of the flux and distributed over its area to initially produce superheated molten iron which is purified as it settles through the flux to bond to the stainless steel plate in a substantially uniform stratum, said aluminothermic reaction being substantially uniform over the entire ultimate junction zone of the iron and stainless steel.

2. In a method of forming clad plate, depositing a thick flux stratum over the upper surface of a stainless steel plate of substantial thickness, preheating the plate to a temperature less than the fusion temperature of the plate, applying and reacting an iron alumino-thermic mixture above the upper surface of the flux and distributed over its area to initially produce superheated molten iron which is purified as it settles through the flux to bond to the stainless steel plate in a substantially uniform stratum, said alumino-thermic reaction being substantially uniform over the entire ultimate junction zone of the iron and stainless steel, securing the composite iron and stainless steel plate to a slab of plain carbon steel with the iron stratum in surface contact with the face of the slab, heating the combined slab and composite plate to a hot reducing temperature, and then bonding the steel slab to the composite plate by the application of pressure.

OTIS R. CARPENTER.
NICHOLAS C. JESSEN.

REFERENCES CITED

The following references are of record in the file of this patent:

UNITED STATES PATENTS

| Number | Name | Date |
|---|---|---|
| 125,245 | Absterdam | Apr. 2, 1872 |
| 537,463 | Hunter | Apr. 16, 1895 |
| 900,366 | Goldschmidt | Oct. 6, 1908 |
| 1,250,612 | Miller | Dec. 18, 1917 |
| 1,306,690 | Gillespie | June 17, 1919 |
| 1,727,570 | Spilsbury | Sept. 10, 1929 |
| 1,813,654 | Armstrong | July 7, 1931 |
| 1,967,754 | Ingersoll | July 24, 1934 |
| 1,997,538 | Armstrong | Apr. 9, 1935 |
| 2,018,725 | Johnson et al. | Oct. 29, 1935 |
| 2,056,673 | Howard | Oct. 6, 1936 |
| 2,102,394 | Trembour | Dec. 14, 1937 |
| 2,160,559 | Orr | May 30, 1939 |
| 2,209,290 | Watts | July 23, 1940 |
| 2,226,403 | Hopkins | Dec. 24, 1940 |
| 2,235,200 | Chace | Mar. 18, 1941 |
| 2,288,184 | Dodson | June 30, 1942 |

FOREIGN PATENTS

| Number | Country | Date |
|---|---|---|
| 475,709 | Great Britain | Nov. 24, 1937 |

OTHER REFERENCES

Welding Handbook, 1942 edition; published by American Welding Society, New York, pages 844–849.